United States Patent
Lai

(10) Patent No.: US 8,538,487 B2
(45) Date of Patent: Sep. 17, 2013

(54) SYSTEM AND METHOD FOR MANAGING LOCAL TIME OF CONTACT PERSON OF MOBILE PHONE

(75) Inventor: Hou-Wen Lai, Shenzhen (CN)

(73) Assignees: Shenzhen Futaihong Precision Industry Co., Ltd., Shenzhen (CN); Chi Mei Communication Systems, Inc., New Taipei (TW)

(*) Notice: Subject to any disclaimer, the term of this patent is extended or adjusted under 35 U.S.C. 154(b) by 23 days.

(21) Appl. No.: 13/339,208

(22) Filed: Dec. 28, 2011

(65) Prior Publication Data
US 2012/0252533 A1 Oct. 4, 2012

(30) Foreign Application Priority Data
Apr. 2, 2011 (CN) .................... 2011 1 0083782

(51) Int. Cl.
*H04B 1/38* (2006.01)
(52) U.S. Cl.
USPC ..... 455/566; 455/418; 455/404.2; 455/456.1; 455/457; 455/459; 368/10; 368/21

(58) Field of Classification Search
USPC .................. 455/566, 418, 404.2, 456.1, 457, 455/459; 368/10, 21
See application file for complete search history.

(56) References Cited

U.S. PATENT DOCUMENTS

| | | | | |
|---|---|---|---|---|
| 5,448,532 A | * | 9/1995 | Kataoka et al. | 368/10 |
| 2010/0075648 A1 | * | 3/2010 | Matsuoka et al. | 455/418 |
| 2013/0003505 A1 | * | 1/2013 | Scott et al. | 368/21 |

* cited by examiner

*Primary Examiner* — Sanh Phu
(74) *Attorney, Agent, or Firm* — Altis Law Group, Inc.

(57) ABSTRACT

In a method for managing a local time of a contact person of a mobile phone, the mobile phone includes a plurality of contact items. Each of the contact items includes time zone information that indicates a time zone corresponding to a location of a contact person of the mobile phone. Time zone information of a contact item is acquired and is sent to a world clock application of the mobile phone. The world clock calculates a local time of a contact person correspond to the contact item. The local time of the contact person is displayed on a display screen of the mobile phone.

12 Claims, 3 Drawing Sheets

SYSTEM AND METHOD FOR MANAGING LOCAL TIME OF CONTACT PERSON OF MOBILE PHONE

BACKGROUND

1. Technical Field

Embodiments of the present disclosure relate generally to information management systems and methods of electronic devices, and more particularly, to a system and method for managing a local time of a contact person of a mobile phone.

2. Description of Related Art

When a user makes a phone call to a contact person who is located in a time zone that is different than that of the user making the call, it is a good idea to know current local time of the contact person and whether it is appropriate time to call the contact person, before making the call. It is inconvenient for the user to manually calculate the local time of the contact person before making the call to the contact person.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
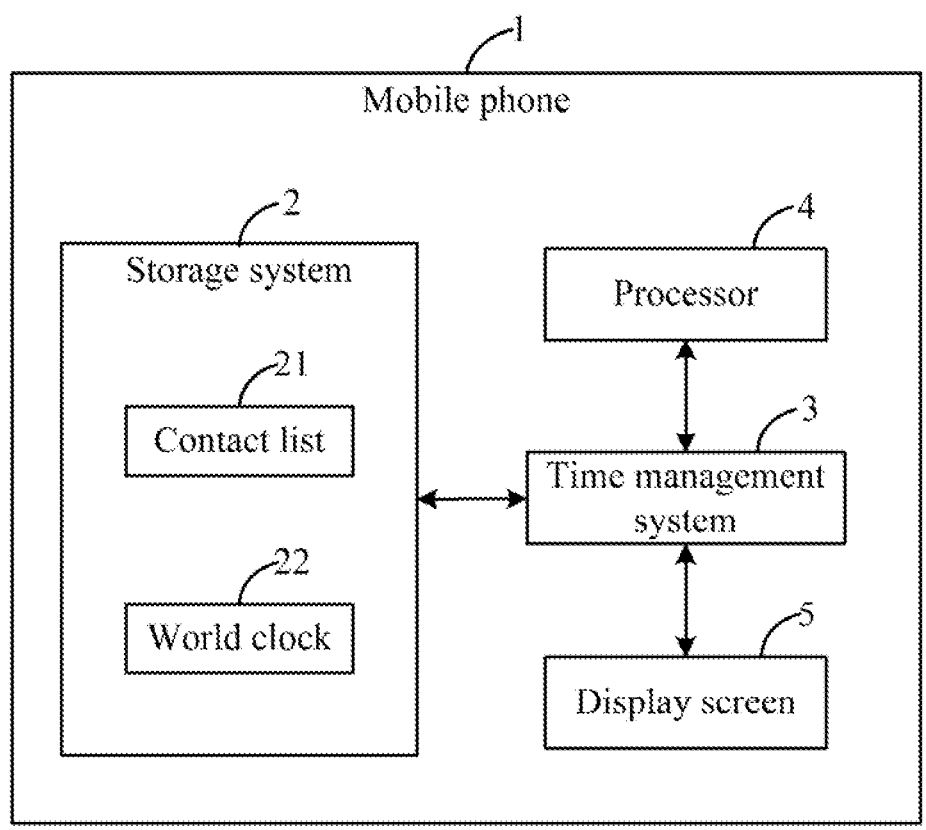
FIG. 1 is a block diagram of one embodiment of a mobile phone including a time management system.

FIG. 1 is a block diagram of one embodiment of a mobile phone 1 including a time management system 3. In the embodiment, the mobile phone 1 further includes a storage system 2, at least one processor 4, and a display screen 5. The storage system 2 includes a contact list 21 and an application of world clock 22. FIG. 1 is just one example of the mobile phone 1 that can be included with more or fewer components than shown in other embodiments, or a different configuration of the various components.

In the embodiment, the contact list 21 includes a plurality of contact items, and each of the contact items includes a name, a telephone number, and time zone information of a contact person that are set by a user when the user establishes or edits the contact list 21. The time zone information indicates the time zone corresponding to a location of a contact person of the mobile phone 1. Worldwide time zones include twenty-four time zones. The world clock 22 calculates local time of each worldwide time zone according to a local time zone and a local time of the mobile phone 1.

The time management system 3 may be in the form of one or more programs stored in the storage system 2 and executed by the at least one processor 4, and can provide a local time of a contact person of the mobile phone 1. In one embodiment, the storage system 2 may be random access memory (RAM) for temporary storage of information, and/or a read only memory (ROM) for permanent storage of information. In other embodiments, the storage system 2 may also be an external storage device, such as a storage card, or a data storage medium. The at least one processor 4 executes computerized operations of the mobile phone 1 and other applications, to provide functions of the mobile phone 1.

Figure 2:
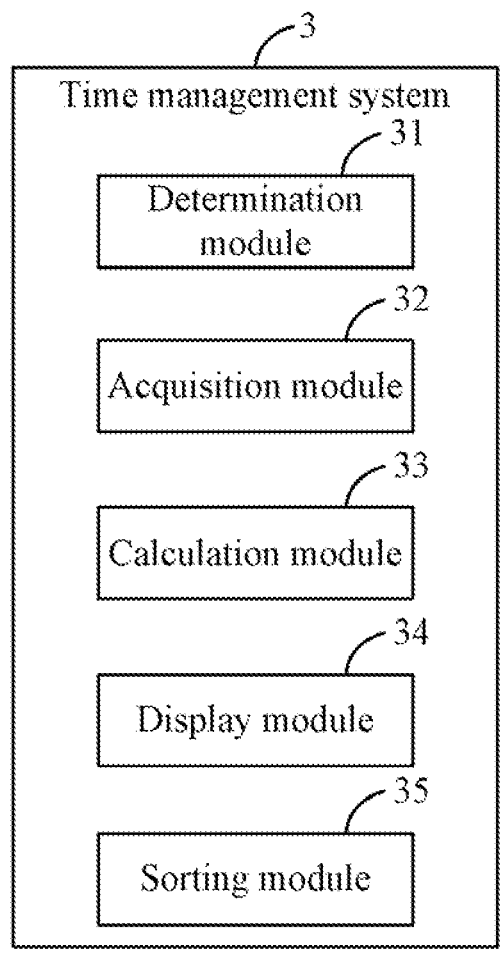
FIG. 2 is a block diagram of one embodiment of functional modules of the time management system included in the mobile phone of FIG. 1.

FIG. 2 is a block diagram of one embodiment of functional modules of the time management system 3 included in the mobile phone 1 of FIG. 1. In one embodiment, the time management system 3 may include a determination module 31, an acquisition module 32, a calculation module 33, a display module 34, and a sorting module 35. The modules 31-35 may comprise a plurality of functional modules each comprising one or more programs or computerized codes that can be accessed and executed by the at least one processor 4. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The determination module 31 determines whether a user checks a local time of a contact person. In one embodiment, each of the contact items in the contact list 21 may include a checkbox option that may be checked. If the user checks the local time of the contact person, the user can select the checkbox option of a contact item corresponding to the contact person. The checkbox option can be in the form of a checkbox or any other graphical interfaces.

The acquisition module 32 acquires time zone information from the contact item of the contact list 21 when the user selects the checkbox option of the contact item. The time zone information may be queried from a network, in one example.

The calculation module 33 sends the acquired time zone information to the world clock 22, and calculates the local time of the contact person using the world clock 22. In the embodiment, the time zone information indicates the time zone of the contact person. The world clock 22 calculates the local time of the time zone of the contact person according to a local time zone and a local time of the mobile phone 1.

The display module 34 acquires the calculated local time of the contact person from the world clock 22 and displays the local time of the contact person on the display screen 5 for observation of the user.

The determination module 31 further determines whether the user browses the contact items in the contact list 21 in an order of the worldwide time zones where the contact persons are located. In one embodiment, the contact list 21 is configured with a browsing option that may be selected for browsing the contact items in the order of the worldwide time zones. If the user browses the contact items in the order of the worldwide time zones, the user can select the browsing option.

The sorting module 35 sorts the contact items in the contact list 21 according the order of the worldwide time zones when the user selects the browsing option. For example, the contact list 21 includes three contact persons "Lucy," "Tom," and "Jim". The contact person "Lucy" locates in a time zone "UTC-12", the contact person "Tom" locates in a time zone "UTC-6", and the contact person "Jim" locates in a time zone "UTC-8". The sorting module 35 sorts the contact items of the three contact persons in an order of "Lucy," "Jim," and "Tom".

Figure 3:
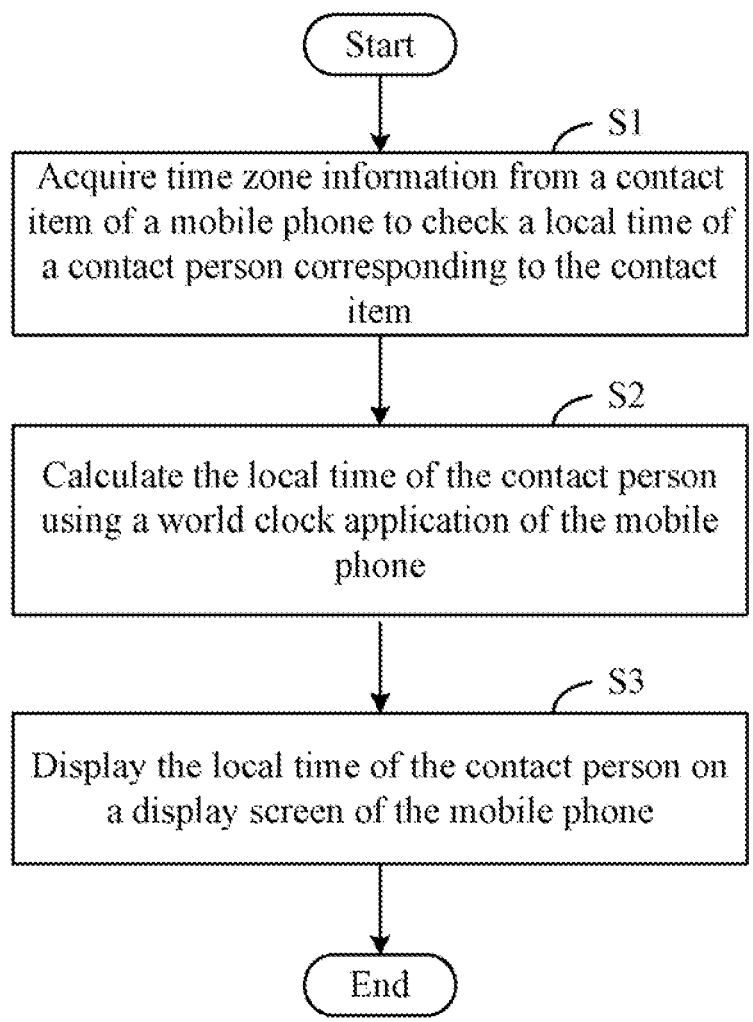
FIG. 3 is a flowchart of one embodiment of a method for managing a local time of contact person of the mobile phone of FIG. 1.

FIG. 3 is a flowchart of one embodiment of a method for managing a local time of contact person of the mobile phone 1 of FIG. 1. Depending on the embodiment, additional steps may be added, others removed, and the ordering of the steps may be changed.

In step S1, the acquisition module 32 acquires time zone information from a contact item of the contact list 21 when the determination module 31 determines that the user checks a local time of a contact person corresponding to the contact item. In the embodiment, the time zone information indicates the time zone of the contact person. If the user checks the local time of the contact person, the user can select the checkbox option for checking the local time corresponding to the contact item of the contact person.

In step S2, the calculation module 33 sends the acquired time zone information to the world clock 22, and calculates the local time of the contact person using the world clock 22. In the embodiment, the world clock 22 calculates the local time of the time zone of the contact person according to a local time zone and a local time of the mobile phone 1.

In step S3, the display module 34 acquires the calculated local time of the contact person from the world clock 22 and displays the local time of the contact person on the display screen 5 for observation of the user.

In the embodiment, the determination module 31 further determines whether the user browses the contact items in the contact list 21 in an order of the worldwide time zones. The sorting module 35 sorts the contact items in the contact list 21 according the order of the worldwide time zones when the user browses the contact items in the contact list 21 in the order of the worldwide time zones.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile phone, comprising:
    at least one processor;
    a storage system that stores a plurality of contact items, wherein each of the contact items comprises time zone information of a contact person and a checkbox option to select the contact person; and
    one or more programs stored in the storage system and executed by the at least one processor, the one or more programs comprising:
    an acquisition module operable to acquire time zone information in relation to a contact person from a contact item stored in the storage system when a checkbox option of the contact item is selected;
    a calculation module operable to calculate a local time of the contact person using a world clock application of the mobile phone according to the acquired time zone information; and
    a display module operable to display the local time of the contact person on a display screen of the mobile phone.

2. The mobile phone of claim 1, wherein the time zone information is added to the contact item by establishing or editing the contact item.

3. The mobile phone of claim 1, wherein the world clock application calculates the local time of the contact person according to a local time zone and a local time of the mobile phone, and the time zone of the contact person.

4. The mobile phone of claim 1, further comprising a sorting module that sorts contact items stored in the storage system according to an order of worldwide time zones.

5. A method for managing a local time of a contact person of mobile phone, comprising:
    (a) acquiring time zone information in relation to a contact person from a contact item stored in a storage system of the mobile phone when a checkbox option of the contact item is selected;
    (b) calculating a local time of the contact person using a world clock application of the mobile phone according to the acquired time zone information;
    (c) displaying the local time of the contact person on a display screen of the mobile phone.

6. The method of claim 5, wherein the time zone information is added to the contact item by establishing or editing the contact item.

7. The method of claim 5, wherein the world clock application calculates the local time of the contact person according to a local time zone and a local time of the mobile phone, and the time zone of the contact person.

8. The method of claim 5, further comprising:
    sorting contact items stored in the storage system according to an order of worldwide time zones.

9. A non-transitory storage medium storing a set of instructions, the set of instructions capable of being executed by a processor of a mobile phone, cause the processor to execute a method for managing a local time of a contact person of the mobile phone, the method comprising:
    (a) acquiring time zone information in relation to a contact person from a contact item stored in a storage system of the mobile phone when a checkbox option of the contact item is selected;
    (b) calculating a local time of the contact person using a world clock application of the mobile phone according to the acquired time zone information;
    (c) displaying the local time of the contact person on a display screen of the mobile phone.

10. The storage medium of claim 9, wherein the time zone information is added to the contact item by establishing or editing the contact item.

11. The storage medium of claim 9, wherein the world clock application calculates the local time of the contact person according to a local time zone and a local time of the mobile phone, and the time zone of the contact person.

12. The storage medium of claim 9, wherein the method further comprising:
    sorting contact items stored in the storage system according to an order of worldwide time zones.

* * * * *